United States Patent
Liu et al.

(10) Patent No.: US 10,097,288 B2
(45) Date of Patent: Oct. 9, 2018

(54) SINGLE-STREAM SLICED MAXIMUM LIKELIHOOD AIDED SUCCESSIVE INTERFERENCE CANCELLATION

(71) Applicant: ZTE Canada Inc., Toronto (CA)

(72) Inventors: Yiwen Liu, Waterloo (CA); Dayong Chen, Kitchener (CA)

(73) Assignee: ZTE Canada Inc., Toronto, Ontario (CA)

( * ) Notice: Subject to any disclaimer, the term of this patent is extended or adjusted under 35 U.S.C. 154(b) by 57 days.

(21) Appl. No.: 15/233,873

(22) Filed: Aug. 10, 2016

(65) Prior Publication Data

US 2017/0048045 A1 Feb. 16, 2017

Related U.S. Application Data

(60) Provisional application No. 62/203,194, filed on Aug. 10, 2015.

(51) Int. Cl.
*H04W 4/00* (2018.01)
*H04B 17/318* (2015.01)
*H04B 7/0413* (2017.01)

(52) U.S. Cl.
CPC ......... *H04B 17/318* (2015.01); *H04B 7/0413* (2013.01)

(58) Field of Classification Search
CPC ............... H04B 17/318; H04B 7/0413; H04W 28/0236; H04W 28/04; H04W 28/048; H04L 25/03006; H04L 25/03821; H04L 25/08; H04L 25/085
See application file for complete search history.

(56) References Cited

U.S. PATENT DOCUMENTS

2014/0348136 A1* 11/2014 Tang .................... H04B 1/7105
370/335
2017/0265145 A1* 9/2017 Benjebbour .......... H04W 52/24

* cited by examiner

*Primary Examiner* — Kan Yuen
(74) *Attorney, Agent, or Firm* — Perkins Coie LLP

(57) ABSTRACT

A method includes estimating spatial signatures of the signal and interference data streams, forming a composite channel matrix comprising all or a subset of estimated spatial signatures, performing QR decomposition (QRD) of channel matrix with different spatial orderings, selecting the stream with the largest post-detection signal-to-interference-plus-noise ratio (SINR) based on the elements of the R matrices from different QRD processes, pre-processing received signal using the Q matrix corresponding to the spatial ordering with the largest SINR, demodulating the strongest stream using single-stream sliced maximum likelihood (SSS-ML) method, cancelling the strongest stream and demodulating the remaining weaker streams using low-complexity MMSE method.

20 Claims, 14 Drawing Sheets

SINGLE-STREAM SLICED MAXIMUM LIKELIHOOD AIDED SUCCESSIVE INTERFERENCE CANCELLATION

CROSS REFERENCE TO RELATED APPLICATIONS

This patent document claims the benefit of priority of U.S. Provisional Patent Application No. 62/203,194, filed on Aug. 10, 2015. The entire content of the before-mentioned patent application is incorporated by reference as part of the disclosure of this document.

TECHNICAL FIELD

The present document relates to wireless communication, and in one aspect, to signal processing performed in a wireless signal receiver.

BACKGROUND

Recent years has seen a significant growth in wireless communication. As the number of wireless devices and applications running on the wireless devices goes up, so does the demand for data bandwidth in wireless communication networks. To meet this growing demand for high performance wireless devices and networks, complexity of next generation wireless networks and devices is expected to significantly increase over the currently deployed wireless devices.

The capacity of modern wireless communication systems such as systems based on Long Term Evolution (LTE) or LTE-Advanced standard using multi-input, multi-output orthogonal frequency division multiplexing (MIMO-OFDM) technology is limited by co-channel interference. To cope with exponential traffic growth, it has become desirable for a wireless receiver to mitigate the detrimental effects of co-channel interference by using advanced signal processing techniques.

SUMMARY

Various techniques are disclosed to successively recover a plurality of signal streams from received wireless signals on multiple antennas in which the receiver signals include intra-UE streams, and/or inter-UE streams and/or inter-cell streams. A stronger stream from the received signal is identified and first demodulated using a single-stream sliced ML demodulation scheme; its waveform is reconstructed and subtracted from the received signal so that remaining stream(s) can be demodulated with minimum influence from the said first stream using a low-complexity MMSE scheme.

In one aspect, ways to improve the performance of a successive interference cancellation (SIC) receiver that is based on demodulating a first stream based on maximum-likelihood criterion are provided.

In another aspect, the disclosed techniques can be used to reduce computational complexity of the improved SIC receiver.

In some embodiments, a user equipment (UE) receiver equipped with at least two receive (RX) antennas for cancelling interference may implement the disclosed techniques in various scenarios typically encountered in wireless cellular networks.

In yet another aspect, a method for signal reception is disclosed. The method includes estimating spatial signatures of the signal and interference data streams, forming a composite channel matrix comprising all or a subset of estimated spatial signatures, performing QR decomposition (QRD) of channel matrix with different spatial orderings, selecting the stream with the largest post-detection signal-to-interference-plus-noise ratio (SINR) based on the elements of the R matrices from different QRD processes, pre-processing received signal using the Q matrix corresponding to the spatial ordering with the largest SINR, demodulating the strongest stream using a single-stream sliced maximum likelihood (SSS-ML) method, cancelling the strongest stream and demodulating the remaining weaker streams using low-complexity MMSE method.

In yet another aspect, techniques for successive interference cancellation of a wireless signal comprising at least two component streams is disclosed. In the technique, a stronger stream based on a signal quality criterion is determined from the at least two component stream. The stronger stream is demodulated using a single-stream sliced maximum likelihood technique by jointly taking into account an effect of the at least two component streams on the received signal to generate information modulated on the stronger stream. A result of the demodulation of the stronger stream from the received wireless signal is subtracted from the received signal, thereby generating an intermediate signal. The intermediate signal is demodulated using a minimum mean square error technique to recover information modulated on a second one of the two component streams.

These, and other, aspects are disclosed in the present document.

DETAILED DESCRIPTION

The capacity of wireless communication systems is limited by co-channel interference due to ever increasing number of base stations deployed over a given geographical area with universal frequency reuse. In recent years, co-channel interference level is further increased with widespread use of spatial multiplexing (SM) and multi-user multiple-inputs and multiple-outputs (MU-MIMO) techniques. Firstly using spatial multiplexing, multiple independent data streams are transmitted from multiple transmit antennas of a base station to single user equipment (UE), causing interference among intra-UE streams. Secondly using MU-MIMO, multiple streams are transmitted from multiple base station antennas, where the multiple streams are directed to two or more different UEs in the same cell. Due to limited channel knowledge at the transmitter, the streams directed to multiple users are not orthogonal so that stream(s) to one UE interfere with the streams directed to other co-scheduled UEs which are called inter-UE interference. Thirdly, the increased number of base stations over a given area increases the level of inter-cell streams, particularly at cell edges.

Due to the ever increasing co-channel interference, receiver-side channel interference mitigation has become essential to further improve spectral efficiency. A wireless receiver has detailed channel state information (CSI), in contrary to transmitter where full CSI is difficult to obtain due to limited feedback. Traditionally, a UE receiver only estimates the CSI related to intra-UE streams. Large performance gains can be obtained, however, if the UE receiver further estimates the CSI of inter-UE and inter-cell streams having a received power level comparable to that of intra-UE streams. In addition to CSI, the UE also requires the knowledge of the modulation schemes used by the inter-UE and/or inter-cell streams.

Figure 1:
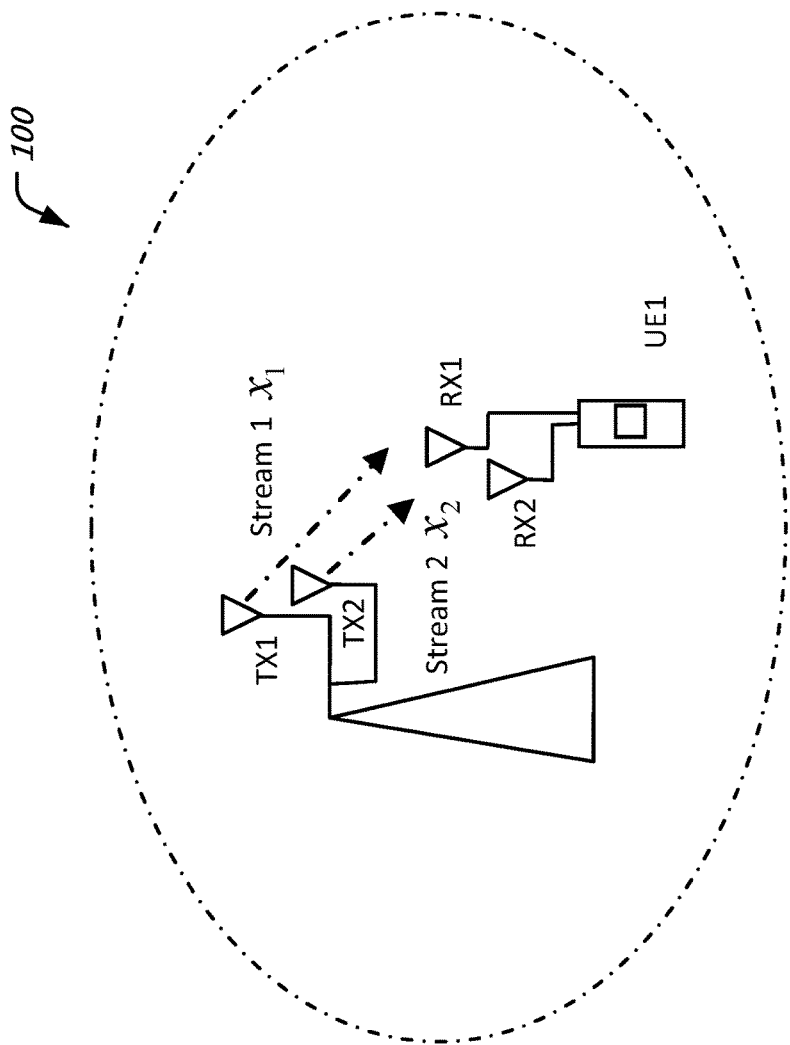
FIG. 1 shows an example of a scenario with interference among intra-UE streams.
Figure 2:
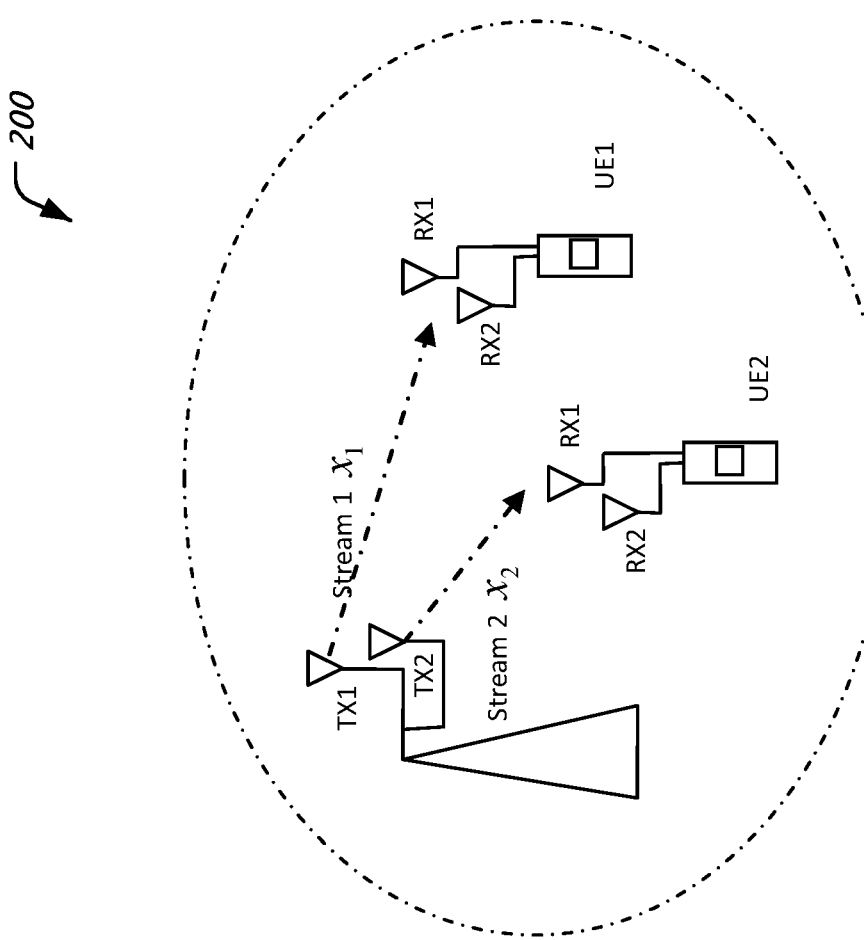
FIG. 2 shows a scenario with interference from inter-UE streams.
Figure 3:
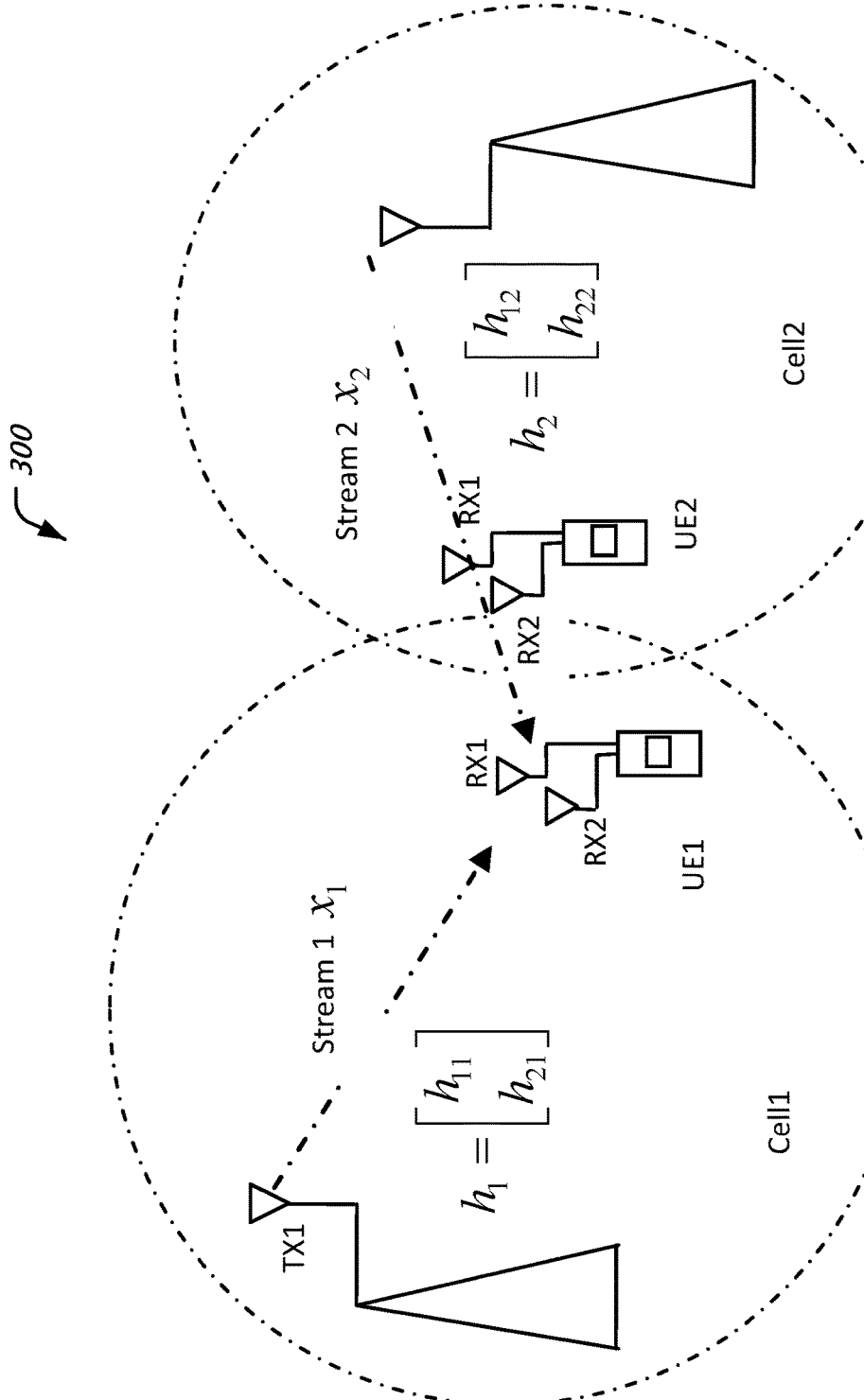
FIG. 3 shows a scenario with interference from inter-cell streams.

Three typical interference scenarios are illustrated in FIG. 1 to FIG. 3 in which a desired UE (UE1) with 2 RX antennas is interfered with an intra-UE stream, an inter-UE stream and an inter-cell stream, respectively.

In FIG. 1, a serving cell base station transmits two intra-UE streams to UE1 causing interference among intra-UE streams.

In FIG. 2, the serving base station transmits two streams, including one stream to UE1 and another stream to co-scheduled UE2, causing interference from inter-UE stream.

In FIG. 3, the serving cell (cell1) base station, which UE1 is connected to, transmits one stream to UE1 at cell edge, while a neighbor cell (cell2) base station transmits a stream to UE2 located in neighbor cell (cell2), causing interference from inter-cell stream. In each of the above scenarios, the two streams may have comparable received power levels, so that the desired UE (UE1) needs to demodulate both streams to avoid severe performance losses, even though ultimately only the information bits in the intra-UE stream are of interest to UE1.

The present document provides, in one aspect, ways to improve the performance of a successive interference cancellation (SIC) receiver by demodulating the strongest stream based on ML criterion and, after removing the influence of the strongest stream, demodulating the second strongest stream based on MMSE criterion which has lower complexity. Since the performance of any SIC receiver is limited by the performance of the first demodulated stream and because using ML technique gives better performance than using MMSE technique, the overall performance of SIC receiver is improved by using the proposed improved SIC receiver. In another aspect, the disclosed techniques can be used to reduce computational complexity of the improved SIC receiver by using a sliced ML demodulation scheme instead of a traditional ML demodulation scheme and by pre-processing the received signal and using pre-processed signal and corresponding channel matrix as input to ML based demodulation.

In some embodiments, a method includes estimating spatial signatures of the signal and interference data streams, forming a composite channel matrix comprising all or a subset of estimated spatial signatures, performing QR decomposition (QRD) of channel matrix with different spatial orderings, selecting the stream with the largest post-detection signal-to-interference-plus-noise ratio (SINR) based on the elements of the R matrices from different QRD processes, pre-processing received signal using the Q matrix corresponding to the spatial ordering with the largest SINR, demodulating the strongest stream using single-stream sliced maximum likelihood (SSS-ML) method, cancelling the strongest stream and demodulating the remaining weaker streams using low-complexity MMSE method.

For simplicity of explanation, embodiments are described using 2×2 MIMO systems as examples for clear illustration. However, as it can be appreciated by those skilled in the art, that the embodiments described herein based on 2×2 MIMO systems can be extended to MIMO systems with a dimension larger than 2×2 which including MIMO systems where the total number of streams is more than 2 and/or where the UE receiver is equipped with more than two RX antennas.

The received signal $y=[y_1\ y_2]^T$ in a 2×2 MIMO system can be modeled as $$y=h_1x_1+h_2x_2+n=Hx+n \qquad \text{Eq. (1)}$$

where T represents the transpose operation and $h_i=[h_{1i}, h_{2i}]^T$, i=1,2, is called spatial signature of TX antenna i containing channel gains between TX antenna i and each of the 2 RX antennas, n $[n_1 n_2]^T$ is i.i.d. AWGN noise vector with variance $N_0$, H is a composite channel matrix consisting of spatial signature of different streams, and $x=[x_1\ x_2]^T$ is a composite transmit symbol vector where $x_i$, i=1, 2, is the modulation symbol drawn from constellation $C_i$ with $M_i$ signal points in the constellation and each signal point carries $Q_i$ bits, for example, $Q_i$=2,4,6 and $M_i$=4,16,64 for QPSK, 16-QAM and 64-QAM, respectively.

Figure 4:
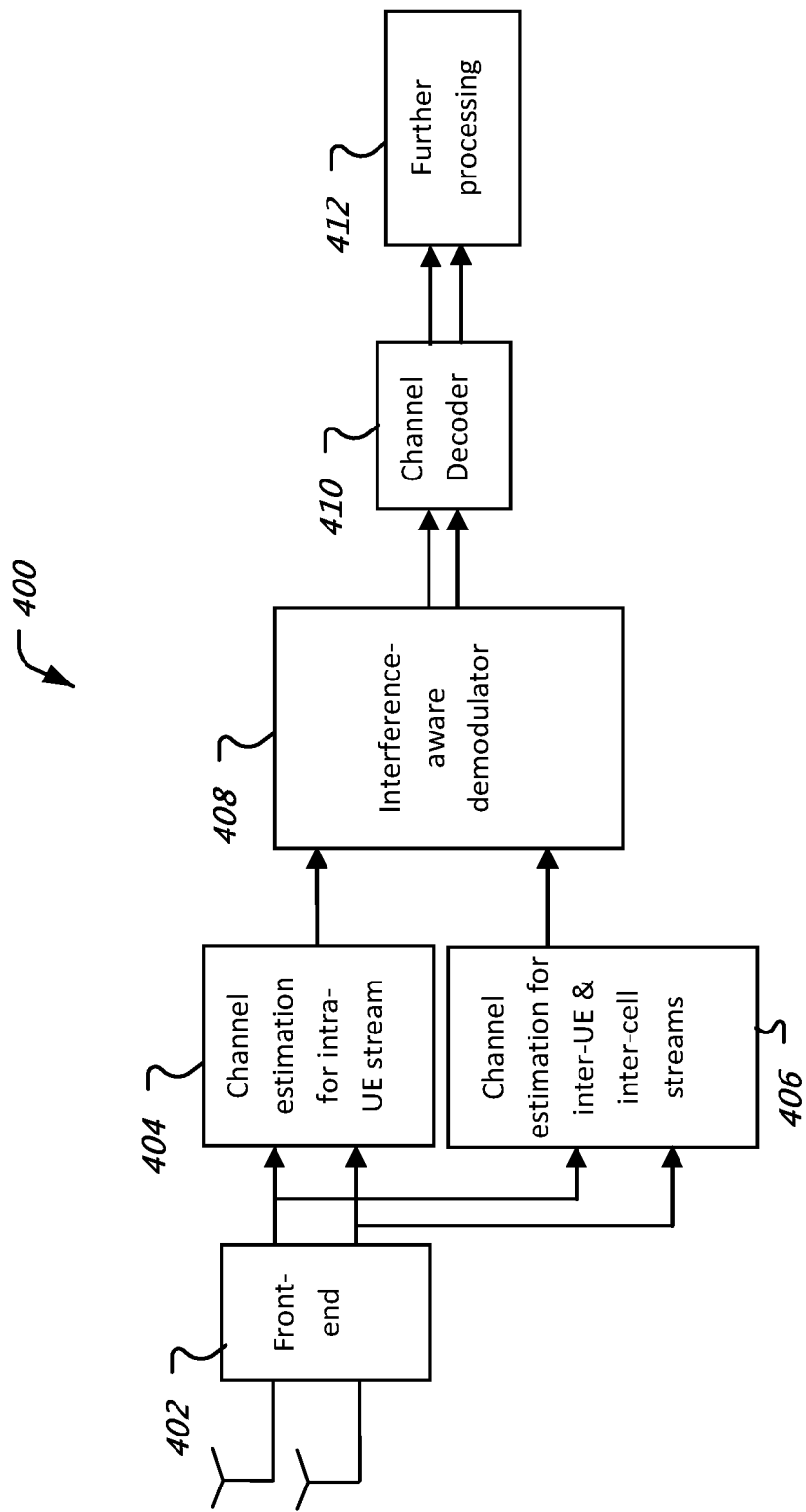
FIG. 4 shows a block diagram of a wireless receiver employing an interference-aware demodulator.

FIG. 4 is a block diagram of an interference-aware wireless receiver 400 that includes a frontend 402, two channel estimation blocks 404 and 406, an interference-aware demodulator 408, a channel decoder 410 and a block 412 for further processing of decoded user bits. One channel estimation block (404) is used to estimate spatial signatures of intra-UE streams whereas the other channel estimation block (406) is used to estimate spatial signatures of inter-UE and/or inter-cell streams. Estimated spatial signatures, together with the modulation schemes used by the individual streams, are forwarded to the interference-aware MIMO demodulator. The demodulated signals of intra-UE streams are passed to channel decoder 410 for FEC decoding, whereas the demodulated signals of inter-UE or inter-cell stream are thrown away because these stream are demodulated to mitigate their interference to the demodulation of intra-UE streams. Finally, the decoded bits of the intra-UE stream(s) are forwarded to a block for further processing, e.g., for extracting information bits.

In digital communications field, several options for demodulating the received signal y are known, given the composite channel matrix H and noise variance $N_0$. Some example algorithms include maximum likelihood demodulation (ML), linear minimum mean square error (MMSE) demodulation and successive interference cancellation using MMSE (MMSE-SIC).

ML has the optimum performance because it can obtain the full diversity order of $N_r$ (where $N_r$ is the number of receive antennas which is equal to 2 in 2×2 case) by treating both streams as useful signals. The drawback of ML however is its prohibitively high complexity which is of the order of $M^2$ for the 2×2 case, assuming both streams use a constellation with M signal points. For example, if both streams use 64-QAM, the ML complexity is of the order of $64^2$=4096.

An MMSE is an optimum linear filter which minimizes the mean square error between estimated symbol vector and true symbol vector. The MMSE typically has very low complexity compared to ML-based methods but poor performance due to spatial correlation of MIMO propagation channel, because MMSE algorithm only achieves a diversity order of $d=N_r-N_t+1$ where $N_r$ and $N_t$ denote the number RX and TX antennas, respectively. For a square MIMO system where $N_t=N_r$, d=1 which means there is no diversity gain when using MMSE.

In one beneficial aspect, an MMSE-SIC receiver provides a trade-off between complexity and performance. MMSE-SIC can have better performance than MMSE and has a lower complexity than an ML implementation. An MMSE-SIC receiver may use MMSE to successively demodulate streams, and after one stream has been demodulated, remove its influence from received signal so that remaining streams are demodulated with reduced interference.

There is, however, a potential drawback in MMSE-SIC receiver because, using MMSE-SIC, the first demodulated stream has exactly the same performance as MMSE with a diversity order 1. Since bit error rate (BER) is inversely related to SNR according to $BER \propto SNR^{-d}$, a diversity order d=1 means higher BER compared to using ML which always achieves a diversity order of Nr which is equal to 2 for the 2×2 example.

As described before, it is desirable to demodulate a first stream with a diversity order of Nr which can only be accomplished by using an ML method. However, using the conventional ML method, both streams are demodulated simultaneously and there is no need for a SIC receiver. Besides, the complexity of ML is too high and the very purpose of SIC is to improve the performance of MMSE, or other linear demodulation method such as Zero-Forcing (ZF), without incurring the high complexity of the conventional ML.

According to some embodiments, a Single-Stream Sliced Maximum Likelihood method, hereafter referred to as SSS-ML method, is applied to demodulate the stronger stream with larger post-detection SINR. Unlike the conventional ML method, the SSS-ML method only demodulates one stream, but still jointly considers the effect of both streams on the received signal, thus achieving the exact ML performance as using the conventional ML method for the stronger stream. In some SSS-ML embodiments, only a computational complexity of M is incurred instead of $M^2$.

The use of slicing advantageously reduces the dimension of ML search by 1 which reduces complexity of an ML search, especially for the case of 2-stream demodulation. For example, for a 64-QAM modulated stream, instead of 64×64 possibilities to be tested, slicing makes it possible to search in one dimension with 64 possibilities. If there are 3 streams, then slicing will reduce complexity from $64^3$ to $64^2$, which is a significant reduction in the number of computations. In some cases, $64^2$ may be still considered to be very high burden. However, most user equipment has only 2 receive antennas and thus may have significant reduction in computational complexity when using sliced ML.

When slicing is used, due to slicing, LLRs of only the stronger selected stream can be obtained, whereas LLRs of the sliced stream cannot be obtained. However, this does not pose a problem for SIC, because SIC demodulates one stream at a time.

The order in which different streams are demodulated and cancelled can affect the performance of an SIC receiver. The receiver performance can be significantly improved if the stream with the larger post-detection SINR, e.g., the stronger stream, is demodulated first. Other criteria may be used to select the "stronger" stream. For example, a priori knowledge about which stream is to be used first may be used to select the "stronger" stream, or a moving time window may be applied to the SINR calculations, and so on. One reason for this performance improvement is that the overall performance of a SIC receiver is limited by the quality of the stream that is demodulated first. After correct demodulation of the stronger stream, the weaker stream (e.g., the stream that is not the stronger stream) can be demodulated with much reduced interference. Post-detection SINR calculation in MMSE-SIC receiver is straightforward by using existing expressions. However, it is difficult to determine post-detection SINR formula for demodulation method based on ML criterion such as SSS-ML.

In some embodiments, a technique, called QR decomposition (QRD), may be used to determine which stream has a larger SINR by performing a QRD of the channel matrix with different spatial orderings.

In some embodiments, a QRD module decomposes a channel matrix into the product of a unitary Q matrix and an upper triangular R matrix. The QRD module may use an algorithm such as lower-upper (LU) factorization using Gaussian elimination in which a system of liner equations is successively simplified. In some embodiments, after the stronger stream has been identified, the corresponding Q and R matrix are used to pre-process received signal so that the SSS-ML demodulation can use a simplified but equivalent MIMO system in which the channel matrix is R rather than H. In some embodiments, the stronger stream is cancelled from the received signal using a soft interference cancellation scheme to minimize propagation of demodulation error of the stronger stream into the demodulation of the weaker stream. In some embodiments, the weaker stream is demodulated using low complexity MMSE method but still with a diversity order of 2 since the stronger stream has now already been removed. These and other embodiments are described in detail herein.

Figure 5:
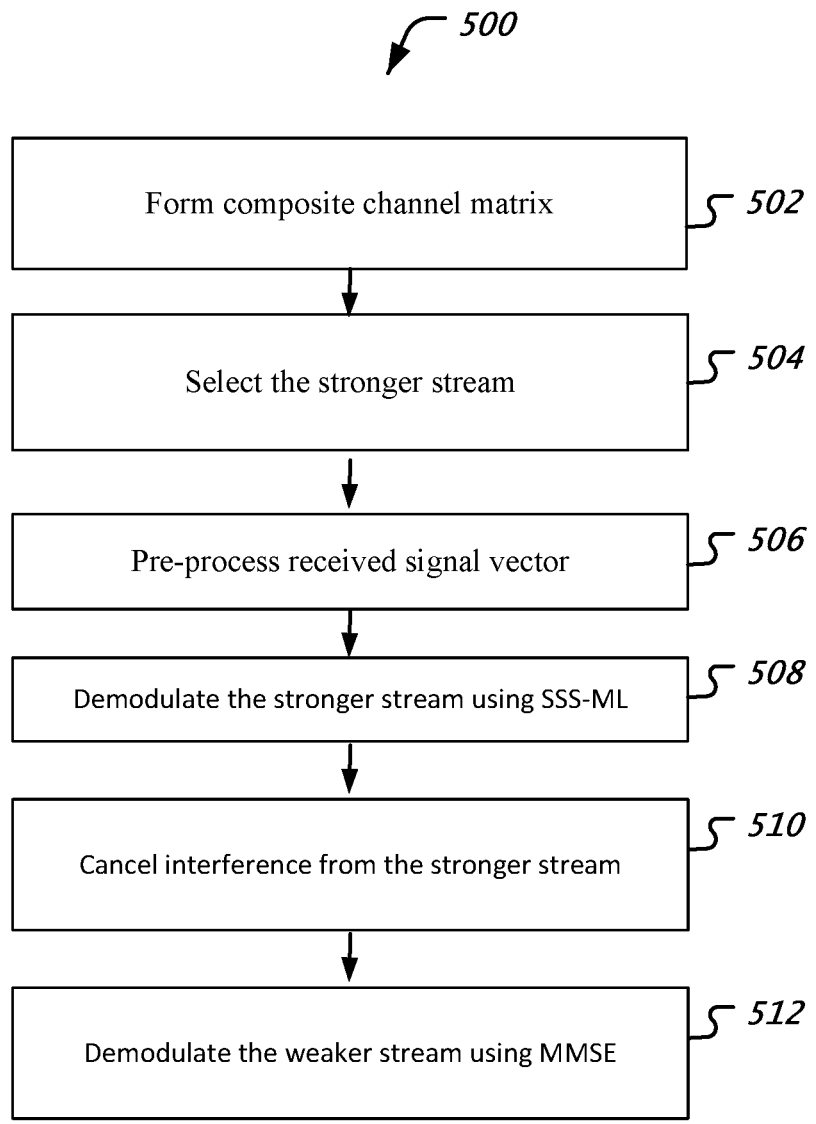
FIG. 5 shows an exemplary flow chart of Single-Stream Sliced Maximum Likelihood Successive Interference Cancellation (SSS-ML-SIC) processing.

FIG. 5 is a flowchart for an example Single-Stream Sliced Maximum Likelihood Successive Interference Cancellation (SSS-ML-SIC) method 500. The method 500 may be implemented at a receiver of wireless signals that is equipped with at least two receiving antennas. In step 502, a composite channel matrix is formed and is made up of either two intra-UE streams, one intra-UE stream and one inter-UE stream or one-intra-UE stream and one inter-cell stream. In step 504, the stronger stream with larger post-detection SINR is determined. In step 506, the received signal is pre-processed. In step 508, the stronger stream is demodulated using an SSS-ML algorithm. In step 510, the stronger stream is cancelled out from received signal. In step 512, the weaker stream is demodulated using a low complexity MMSE method.

In some embodiments, the QRD module decomposes a channel matrix H into the product of a unitary matrix Q with $Q^H Q=I$ and an upper triangular matrix R:

$$H = QR, R = \begin{bmatrix} r_{11} & r_{12} \\ 0 & r_{22} \end{bmatrix} \quad \text{Eq. (2)}$$

The received signal is projected into the subspace spanned by the columns of Q by pre-multiplying y with Hermitian transpose of Q, resulting in a new received vector $z=[z_1\ z_2]^T$ $$z = Q^H y = Q^H QRx + Q^H n = Rx + n', \text{ where } n' = Q^H n \text{ and } x = [x_1 x_2]^T \quad \text{Eq. (3)}$$

Since multiplication by a unitary matrix doesn't change noise statistics of the noise vector, the new MIMO system $z=Rx+n'$ is equivalent to the original one: $y=Hx+n$.

A conventional ML demodulator calculates Euclidean Distances (EDs), one ED for every possible combination of $x_1$ and $x_2$. Using the simplified MIMO system equation $z=Rx+n'$, ED can be expressed as a function of both $x_1$ and $x_2$, and can be written as the sum of two partial EDs (PEDs):

$$ED(x_1,x_2) = |z_1 - r_{11}x_1 - r_{12}x_2|^2 + |z_2 - r_{22}x_2|^2 = PED1(x_1,x_2) + PED2(x_2) \quad \text{Eq. (4)}$$

Where PED1 depends on both $x_1$ and $x_2$ whereas PED2 depends only on $x_2$.

Figure 6:
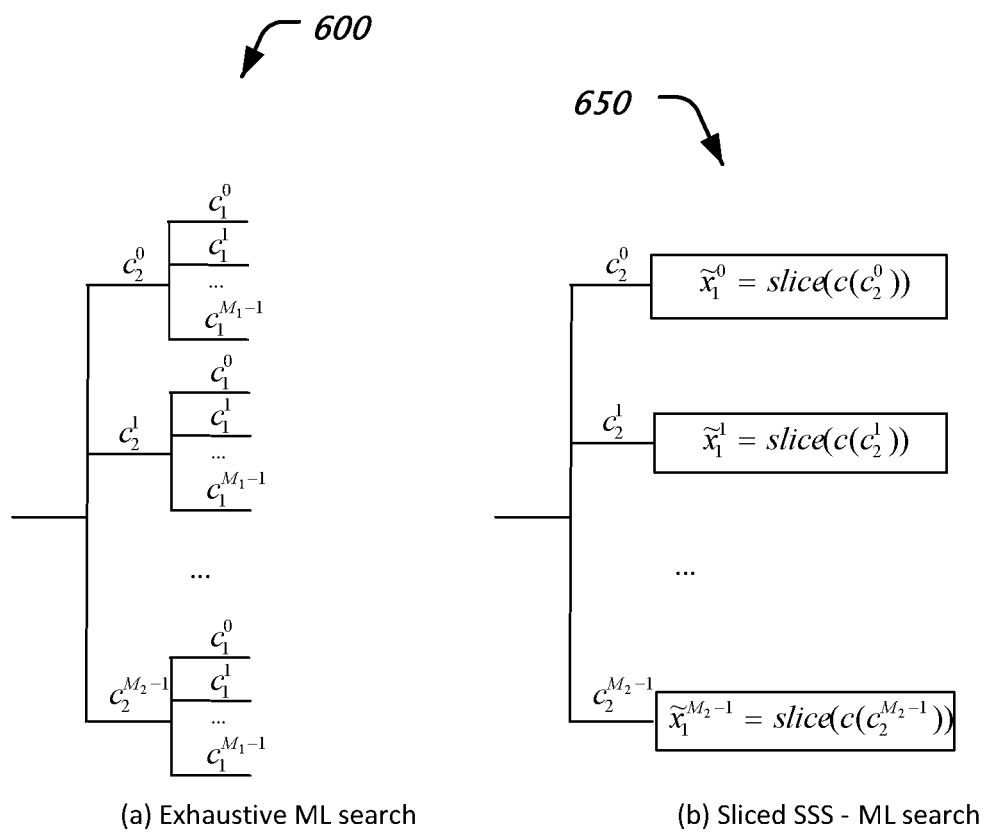
FIG. 6 shows the difference between exhaustive ML search and SSS-ML search using slicing.

FIG. 6(a) illustrates an example 600 of a conventional ML algorithm. The conventional ML algorithm usually includes a step that searches all combinations of $x_1$ and $x_2$ to find the optimum solution that minimizes the ED. Here $\{c_1^0, c_1^1, \ldots, c_1^{M_1-1}\}$ are all signal points in constellation $C_1$ used by $x_1$ and $\{c_2^0, c_2^1, \ldots, c_2^{M_2-1}\}$ are all signal points in constellation $C_2$ used by $x_2$.

To avoid exhaustive search of $M_1 \times M_2$ combinations, as is incurred in the example 600, some embodiments (650) can use a sliced ML approach. Using a sliced ML approach, only the stream represented by $x_2$ may be demodulated, by searching all possible $x_2$ values in constellation $C_2$ as illustrated (650) FIG. 6(b). For each $x_2$ hypothesis, the optimum $x_1$ is obtained by slicing a complex number c, which is a function of $x_2$, such that the sliced $x_1$, denoted as $\tilde{x}_1$, is the signal point that is closest to $c(x_2)$ in the constellation $C_1$ used by $x_1$.

In order to get a sliced value of $x_1$, the PED1 can first be expressed in the following form:

$$PED1(x_1, x_2) = \quad \text{Eq. (5)}$$
$$|z_1 - r_{11}x_1 - r_{12}x_2|^2 = \left| r_{11} \left( \frac{z_1 - r_{12}x_2}{r_{11}} - x_1 \right) \right|^2 = r_{11}^2 |c - x_1|^2$$
$$\text{where } c = \frac{z_1 - r_{12}x_2}{r_{11}}.$$

As can be seen in Eq. (5), for a given signal point $c_2^i$ in constellation $C_2$ used by $x_2$, the signal point $\tilde{x}_1$ which is closest to c in the constellation $C_1$ guarantees PED1 is the minimum partial Euclidean Distance among all possible signal points in constellation $C_1$. Thus, the slicing operation can eliminate the need to exhaustively search through all signal points in $C_1$ for a given $x_2$ while achieving exactly the same performance as exhaustive ML search.

Figure 7:
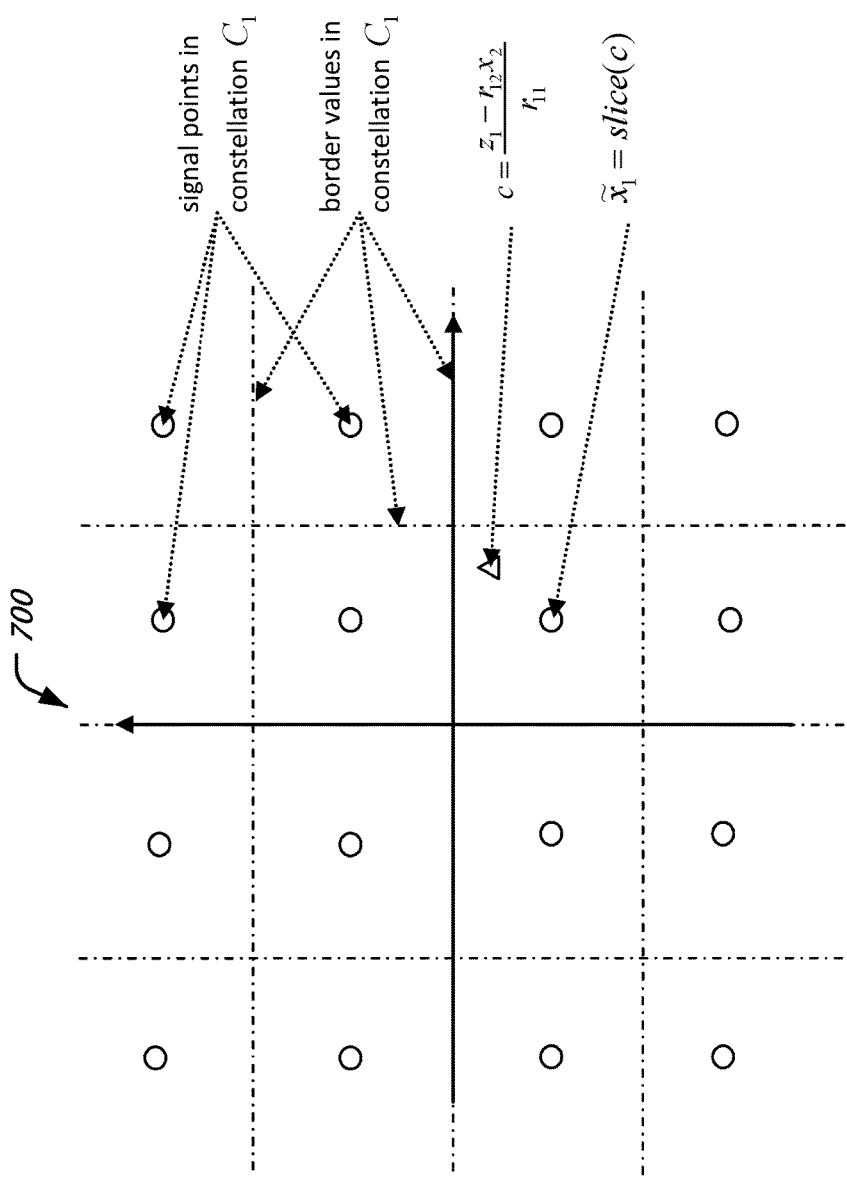
FIG. 7 shows an exemplary slicing operation for 16QAM.

FIG. 7 illustrates an example of a slicing scheme. Slicing can be implemented as a low-complexity operation for QAM modulation. The signal point $\tilde{x}^1$ can be found by comparing the real and imaginary parts of c with border values, as depicted in the two dimensional graph of symbol values in a 16 QAM constellation in FIG. 7.

Then the LLRs for the k th bit of $x_2$ can be calculated as $$LLR_{2,k} = \quad \text{Eq. (6)}$$
$$\frac{1}{N_0} \left( \min_{x_2 \in S_{2,k}^0} ED\{x_2, \text{slice}(c(x_2))\} - \min_{x_2 \in S_{2,k}^1} ED\{x_2, \text{slice}(c(x_2))\} \right),$$
$$k = 1, 2, \ldots Q_2$$

where $s_{2,k}^0$ is the set of possible $x^2$ signal points in constellation $C_2$ whose k th bit is a 0 and $s_{2,k}^1$ is the set of possible $x^2$ signal points in constellation $C_2$ whose k th bit is a "1". It will be appreciated by one of skill in the art that $LLR_{2,k}$ calculated using the above formula are exactly the same as using the conventional ML method, except that only LLRs for the second stream are calculated and with much lower complexity.

It may, however, not be beneficial to always demodulate the second stream first. It is very beneficial for a SIC receiver to first demodulate the stronger stream with larger post-detection SINR. By demodulating the stronger stream, the symbol error rate is lower for the demodulation pass for the stronger stream which in turn improves the demodulation performance of the weaker stream. On the other hand, the SSS-MIL demodulation only demodulates the stream corresponding to the r element of R matrix to lower computational complexity. To determine which stream has a larger post-detection SINR, and thus should be demodulated first, $x_1$ and $x_2$ can be switched along with the order of spatial signatures in composite channel matrix since $y=Hx+n$ is the same as $y=H'x'+n$:

$$y = Hx + n = [h_1 h_2]\begin{bmatrix} x_1 \\ x_2 \end{bmatrix} + n = [h_1 h_2]\begin{bmatrix} x_2 \\ x_1 \end{bmatrix} + n = H'x' + n \quad \text{Eq. (7)}$$

where H is the original channel matrix, H' is channel matrix with swapped spatial signatures. Different ordering of spatial signatures corresponds to different spatial orderings. Performing QRD for each ordering reveals the corresponding post-detection SINR as explained herein. For the 2×2 MIMO system considered, there are two spatial orderings; the first one corresponds to H and the second one corresponds to H'. If the QRD corresponding to the first spatial ordering indicates a larger SINR, then $x_2$ or the second stream is demodulated first. Otherwise, if the QRD for the second spatial ordering indicates a larger SINR, then $x_1$ or the first stream is demodulated first.

With respect to the issue of how to estimate SINR based on elements of R matrix, the MIMO system $z=R_1 x + n'$ corresponds to two scalar equations $$z_1 = r_{11}x_1 + r_{12}x_2 + n'_1$$
$$z_2 = r_{22}x_2 + n'_2 \quad \text{Eq. (8)}$$

A larger $r_{22}$ value means $x_2$ can be solved using the second equation alone if $x_2$ is much larger than noise $n'_2$. Once $x_2$ is solved, it can be plugged into the first equation where a larger $r_{11}$ increases the reliability of demodulating $x_1$, because $r_{11}$ represents the signal component for demodulating $x_1$, whereas a larger $r_{12}$ decreases the reliability of demodulating $x_1$, because $r_{12}$ represents the interference from $x_2$. Thus, the mean of the diagonal elements of the R matrix can be used as an estimate for the SINR.

$$SINR \propto +\frac{1}{2}(r_{11}+r_{22}) \quad \text{Eq. (9)}$$

Let $H=Q_1 R_1$ correspond to the first spatial ordering and $H'=Q_2 R_2$ correspond to the second spatial ordering. If SINR ($R_1$)>SINR($R_2$) then the second stream is demodulated first, otherwise the first stream is demodulated first.

Figure 8:
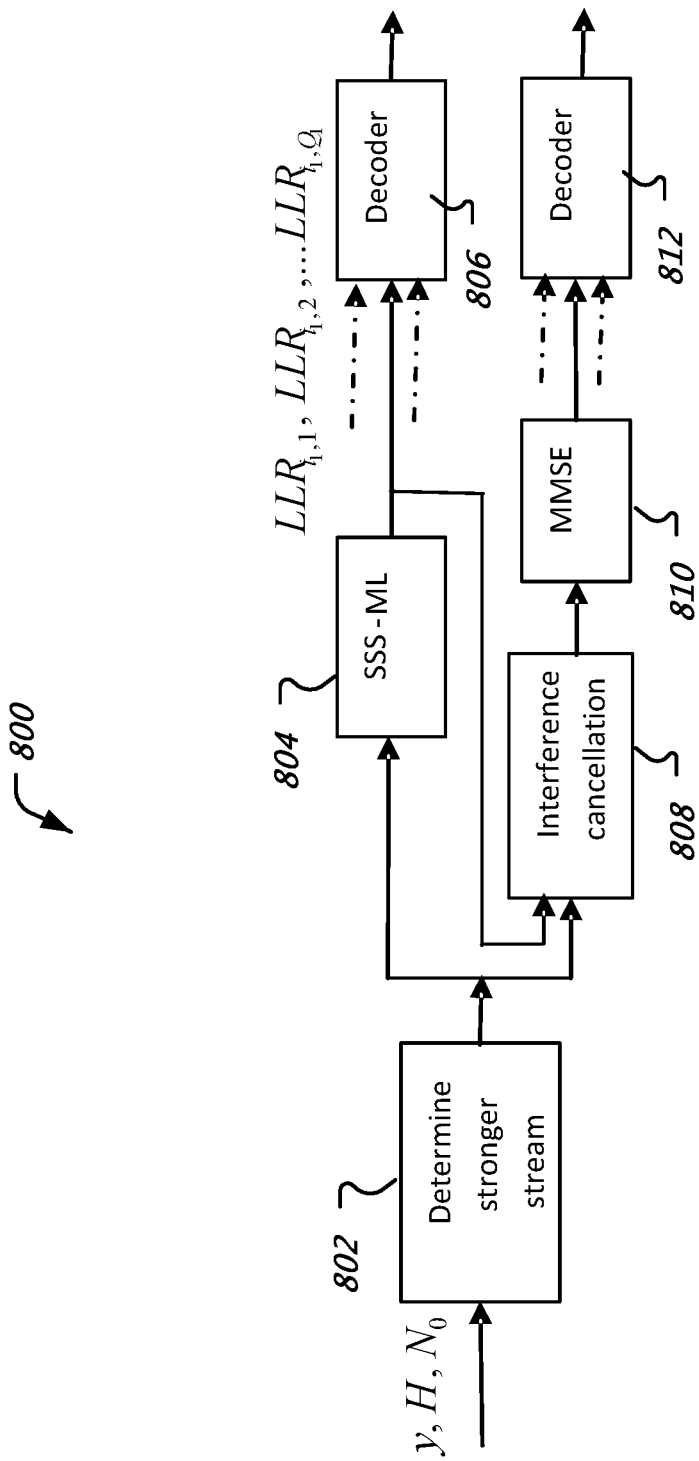
FIG. 8 shows a block diagram of an exemplary improved pre-decoding SIC receiver.

FIG. 8 shows the structure of an exemplary SSS-ML-SIC demodulator 800 in a pre-decoding SIC receiver where interference cancellation (808) is done subcarrier by subcarrier before channel decoder (812) is started. Depending on individual subcarriers, the first or second stream can be the stronger stream, and by the advantageous ordering described herein, the quality of LLRs of both streams are improved so that codeword associated with each stream can be decoded correctly with higher probability.

As depicted in the demodulator 800, the module 802 determines stronger stream from the R matrices corresponding to different spatial orderings. The module 802 may use a numerical comparison of the SINR values to decide the stronger stream, which may be the stream with a greater SINR. The stronger stream is processed by the SSS-ML module 804, as described herein. The effect of the stronger signal is subtracted in the interference cancellation module 808 and the resulting output is processed through the MMSE module 810. The outputs of both the SSS-ML module 804 and the MMSE module 810 are processed through respective decoders 806, 812 to extract information bits from the received signal. Each of the modules 802, 804, 806, 808, 810 may implement the various algorithms described herein and may be implemented in hardware and/or software and executed by a processor as processor-executable code.

Figure 9:
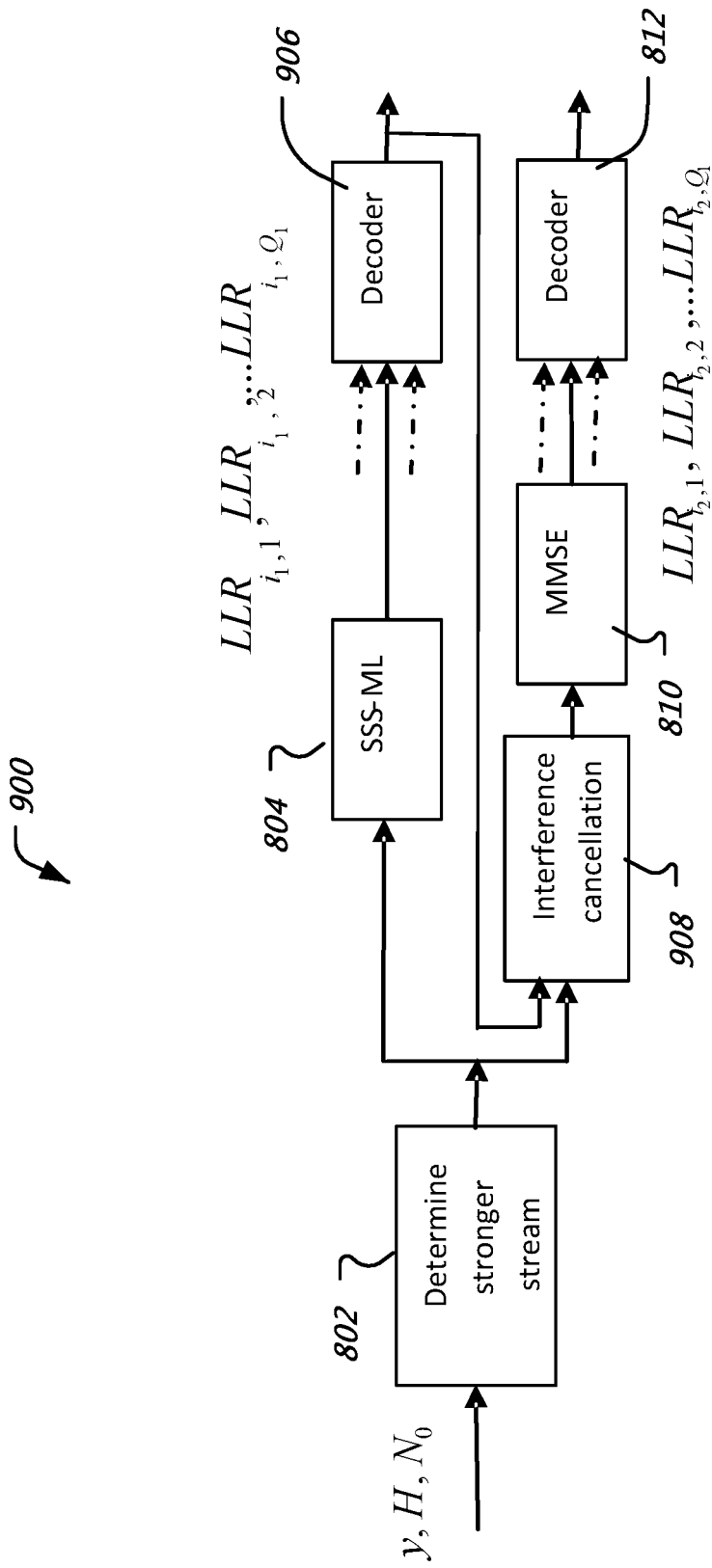
FIG. 9 shows a block diagram of an exemplary improved post-decoding SIC receiver.

FIG. 9 shows an example embodiment of an SSS-ML-SIC demodulator 900 in a post-decoding SIC receiver where interference cancellation 908 is performed after symbol demodulation on all subcarriers have been completed (906). It will be appreciated by one of skill in the art that, in the demodulator 900, the LLRs of the stronger stream have improved quality which increases the probability that the codewords associated with both the stronger and weaker stream are decoded correctly with higher probabilities.

Figure 10:
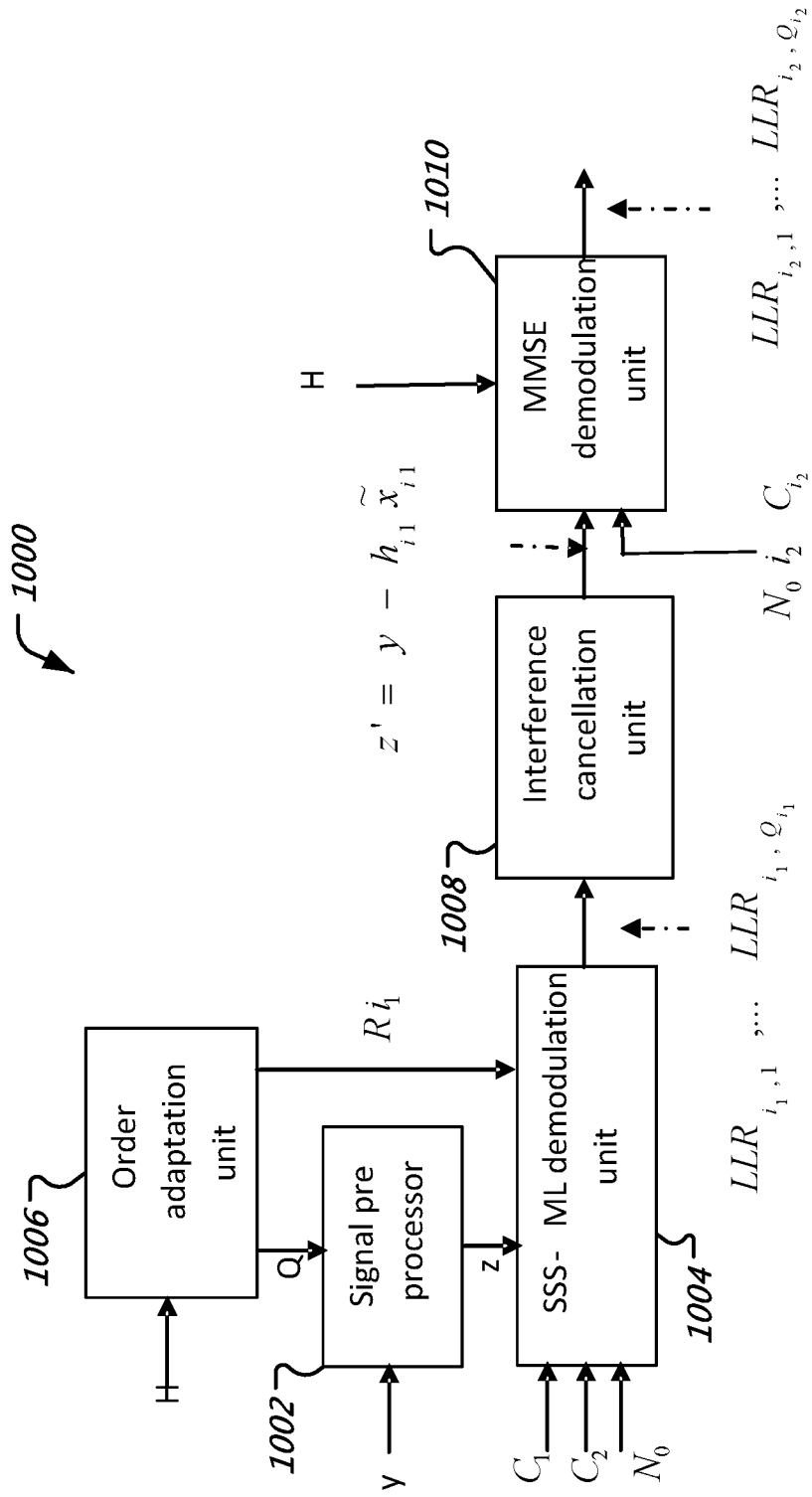
FIG. 10 illustrates an exemplary apparatus of the embodied SSS-ML-SIC demodulator.

FIG. 10 shows an example block diagram of an embodied SSS-ML-SIC demodulator 1000 that comprises an order adaptation unit 1006, a signal pre-processor 1002, an SSS-ML demodulation unit 1004, an interference cancellation unit 1008 and an MMSE demodulation unit 1010.

Figure 11:
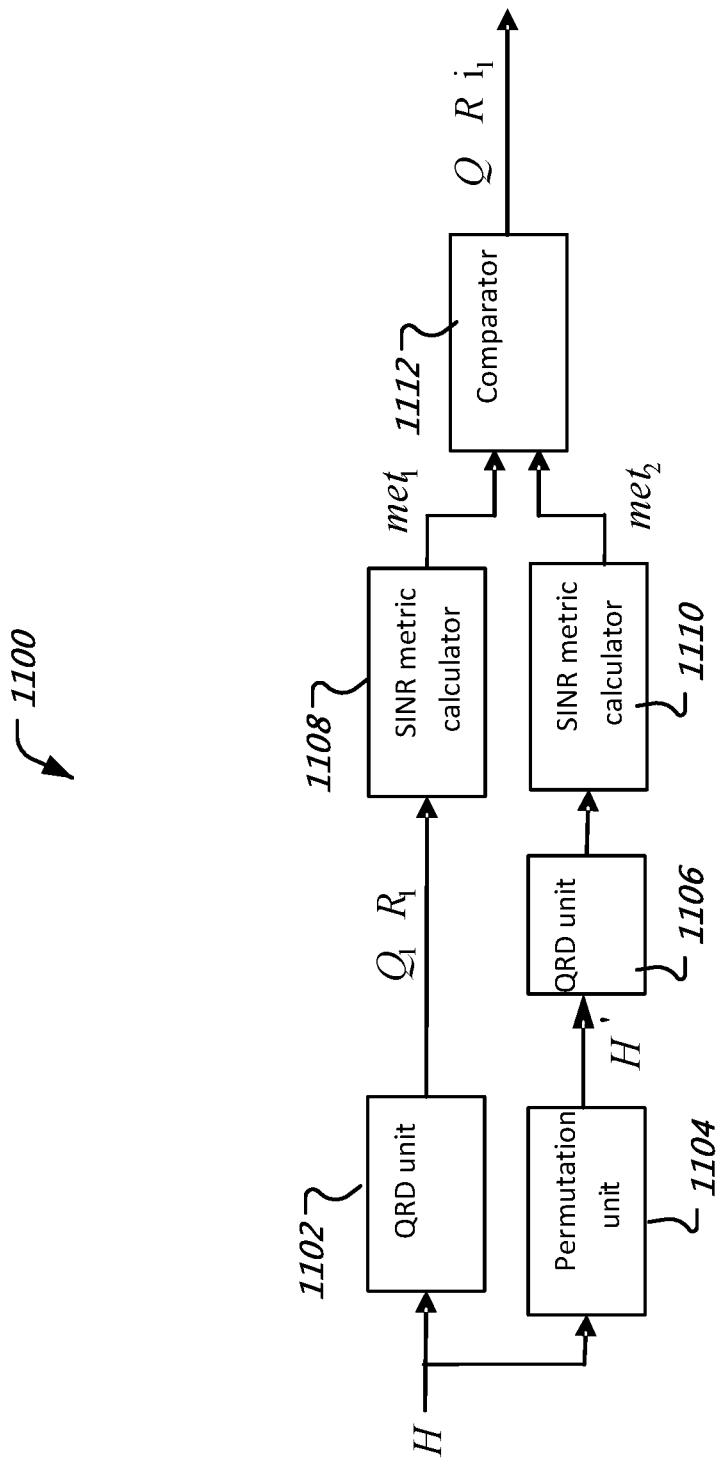
FIG. 11 shows an exemplary embodiment of order-adaptation unit.

FIG. 11 illustrates an exemplary order-adaptation unit 1100 used to determine the stronger stream and output parameters accordingly. The order-adaptation unit 1100 includes a permutation unit 1104, QRD units 1102, 1106 for computing QR decomposition corresponding to different spatial orderings, SINR metric calculation units 1108, 1110 for computing metrics indicating SINRs and a comparator 1112 for comparing SINR metrics to determine which stream is stronger. The channel matrix H is passed to QRD unit 1102 which computes $Q_1$ and $R_1$. $Q_1$ is temporarily stored in memory and $R_1$ is passed to the SINR metric calculation unit 1108. At the same time, channel matrix with swapped columns, generated by the permutation unit 1104, is passed to the QRD unit 1106 to compute $Q_2$ and $R_2$. As before, $Q_2$ is stored in memory and $R_2$ is passed to the SINR metric calculation unit 1110. The SINR metric calculation unit 1108, 1110 calculates SINR($R_1$) and SINR($R_2$) using $R_1$ and $R_2$ as inputs, respectively and the SINR metrics are passed to the comparator 1112, which determines which stream should be demodulated first and generates the outputs correspondingly. If SINR($R_1$)>SINR($R_2$), the second stream corresponding to $x_2$ is demodulated first, the stream index $i_1$ is set to 2, and $Q=Q_1$, $R=R_1$ and $i_1$ are outputs from the order-adaptation unit. If SINR($R_1$)≤SINR($R_2$), then $i_1$ is set to 1 and $Q=Q_2$, $R=R_2$ and $i_1$ are outputs from the order-adaptation unit.

The output Q is used to pre-process received signal vector by pre-multiplying y with $Q^H$ to produce a transformed received vector z which is passed to the SSS-ML demodulation unit. The outputs from the order-adaptation unit including $i_1$ and R are also passed to the SSS-ML demodulation unit. Another input to the SSS-ML demodulation unit is noise variance estimate $N_0$ generated by the parameter estimation block. With these inputs and the knowledge about the constellations used by the first and second stream, denoted respectively as $C_1$ and $C_2$, SSS-ML demodulation can be performed.

Figure 12:
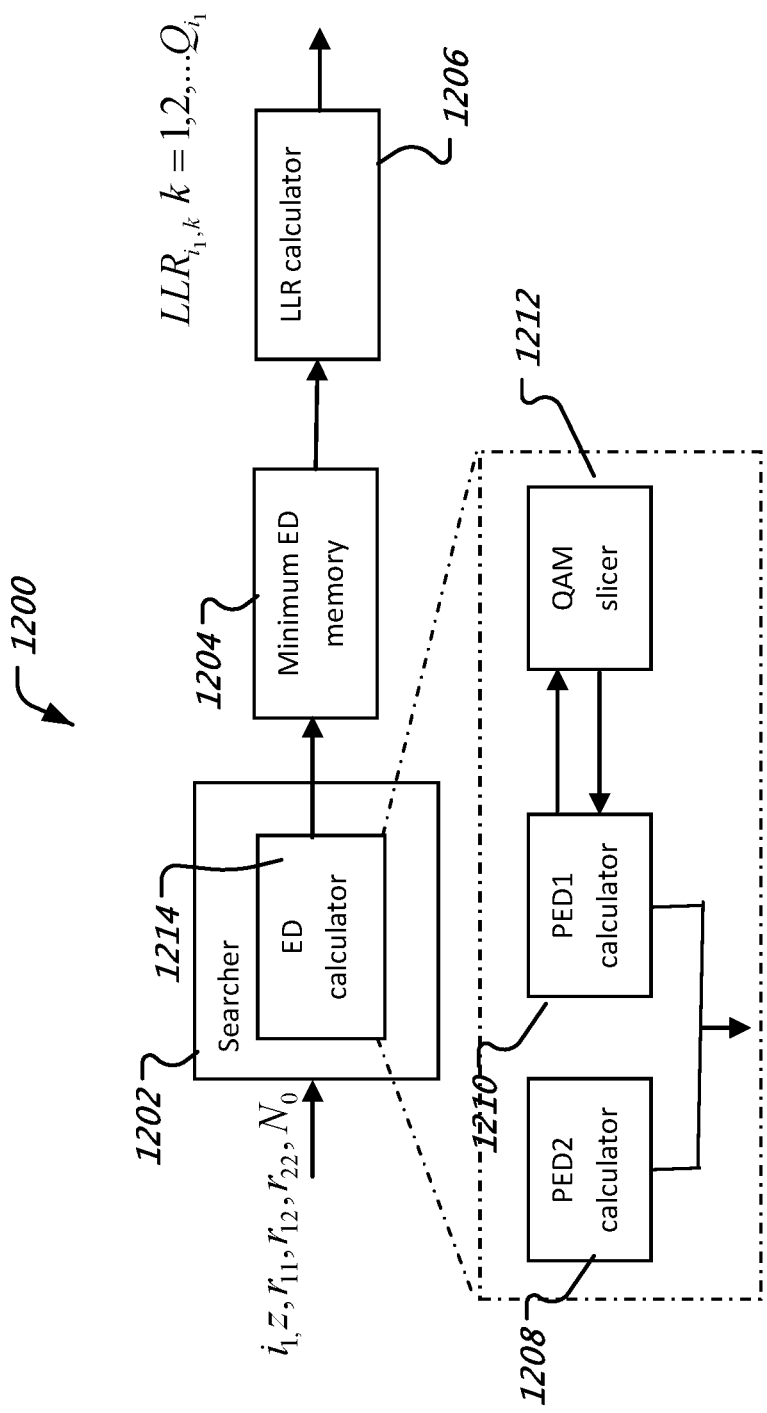
FIG. 12 shows an exemplary embodiment of SSS-ML demodulation unit used in SSS-ML-SIC demodulator.

FIG. 12 illustrates an exemplary SSS-ML demodulation unit 1200. The SSS-ML demodulation unit 1200 consists of a searcher 1202, a memory 1204 for storing $2Q_{i_1}$ minimum EDs generated by the searcher (two minimum EDs for each bit of $x_{i_1}$) and an LLR calculator 1206. First, the memory locations for storing minimum ED are initialized with a very large positive value. Then the searcher 1202 searches all possible signal points in the constellation of the stronger stream. More specifically, if $i_1$=1, then the searcher 1202 searches all possible constellation points of $x_1$ in which case PED2 1208 is a function of only $x_1$, and $x_2$ is obtained by slicing $c(x_1)$ which is a function of $x_1$. If $i_1$=2, the searcher searches all possible constellation points of $x_2$ in which case PED2 1208 is a function of only $x_2$, and $x_1$ is obtained by slicing $c(x_2)$ which is a function of $x_2$. In general the ED can be expressed as $$ED(x_{i_1}, x_{i_2}) = |z_1 - r_{11}x_{i_2} - r_{12}x_{i_1}|^2 + |z_1 - r_{22}x_{i_1}|^2 = PED1(x_{i_2}, x_{i_1}) + PED2(x_{i_1}) \quad \text{Eq. (10)}$$

The searcher is executed $M_{i_1}$ times where $M_{i_1}$ is the number of signal points of the constellation used by the stronger stream $C_{i_1}$. For each hypothesis of $x_{i_1}$, which corresponds to $Q_{i_1}$ bits, two EDs are calculated $$ED_k^0 = \min_{x_{i_1} \in S_{i_1,k}^0} ED\{x_{i_1}, \text{slice}(c(x_{i_1}))\} \text{ and}$$

$$ED_k^1 = \min_{x_{i_1} \in S_{i_1,k}^1} ED\{x_{i_1}, \text{slice}(c(x_{i_1}))\}.$$

If $ED_k^0$ is smaller than its current minimum stored in the memory, then $ED_k^0$ replaces the current minimum. Similar operation is done for $ED_k^1$. After all hypotheses of the stronger stream have been processed, the memory contains the EDs required to generate the LLR for each bit of $x_{i_1}$. The LLR calculator 1206 calculates the LLR for each bit of $x_{i_1}$ by subtracting the corresponding $ED_k^1$ from $ED_k^0$ and normalizing the difference by $1/N_0$. The scaling is used to take into account that $N_0$ is in general different for individual subcarriers. One of the most resource intensive part of the SSS-ML demodulation unit 1200 is ED computation 1214. The searcher 1202 computes the EDs by involving an ED calculator 1214 which comprises a PED2 calculator 1208 and a PED1 calculator 1210. PED2 calculator 1208 uses the hypothesized $x_{i_1}$ and $r_{22}$ to calculate PED2. PED1 calculator 1210 which is more complex than PED2 calculator 1208 requires hypothesized $x_{i_1}$ value, $r_{11}$ and $r_{12}$ as inputs to calculate PED1. In order to get a sliced value of $x_{i_2}$, the c value must first be computed which is derived as follows $$PED1(x_{i_1}, x_{i_2}) =$$ Eq. (11)

$$|z_1 - r_{12}x_{i_1} - r_{11}x_{i_2}|^2 = \left|r_{11}\left(\frac{z_1 - r_{12}x_{i_1}}{r_{11}} - x_{i_2}\right)\right| = r_{11}^2 |c - x_{i_2}|^2$$

It can be seen that $$c = \frac{z_1 - r_{12}x_{i_1}}{r_{11}}.$$

The procedure for computing PED1 thus includes: (1) computing c, (2) slice c to get $x_{i_2}$, that is closest to c in constellation, i.e. $\tilde{x}_{i_2}$=slice(c) and (3) computing PED1 PED1=$r_{11}^2|c-\tilde{x}_{i_2}|^2$. The PED1 is then added to PED2 to get ED. The slicing may be implemented using a QAM slicer 1212.

In some embodiments, a SIC method of improved successive interference cancellation for allowing a first stronger stream to be demodulated with the exact ML performance but much lower complexity than using a conventional ML method includes:

(A) forming composite channel matrix comprises placing spatial signatures of different streams to be demodulated side by side where a stream can be an intra-UE stream, an inter-UE stream or an inter-cell stream; and (B) determining the stronger stream comprises performing QR decomposition (QRD) of the composite channel matrix, mapping the elements of R matrix into one SINR metric; swapping spatial signatures of the channel matrix, performing QRD of the channel matrix, mapping the elements of the R matrix into another SINR metric; comparing the two SINR metrics and selecting the stream with the larger SINR. In some embodiments, an SINR metric is the mean of the diagonal elements of the R matrix.

In some embodiments, the Q matrix corresponding to the optimal spatial ordering is used to pre-process received signal and the pre-processed signal is used as input for SSS-ML demodulation. In some embodiments, the R matrix corresponding to the optimal spatial ordering is used for demodulating the stronger stream.

In some embodiments, the stronger stream is demodulated using a Single-Stream Maximum Likelihood method (SSS-ML) to allow the stronger stream to be demodulated with the bit exact ML performance. In some embodiments, SSS-ML computes a Euclidean Distance (ED) as sum of two partial EDs (PEDs) PED1 and PED2, and wherein PED2 only depends on the symbol of the stronger stream whereas PED1 depends on the symbols of both streams. In some embodiments, PED1 is calculated by computing a c value which is a function of a hypothesized value of the stronger symbol, and wherein the best symbol for the weaker stream given a hypothesis of the stronger stream symbol is obtained by slicing the c value in the QAM constellation used by the weaker stream. In some embodiments, the improved successive interference cancellation may be used in a pre-decoding successive interference cancellation receiver. In some embodiments, the improved successive interference cancellation may be used in a post-decoding successive interference cancellation receiver.

In some embodiment of the SIC method, the LLRs of the stronger stream are used to calculate soft symbol for soft cancellation of the stronger stream.

In some embodiments of the SIC method, demodulating the weaker stream comprises scaling the spatial signatures of the stronger stream to suppress residual interference from the stronger stream when demodulating the weaker stream using MMSE.

In some embodiments, an SSS-ML-SIC apparatus includes (1) an order-adaptation unit, (2) a pre-processing unit, (3) an SSS-ML demodulation unit, (4) an interference cancellation unit and (5) an MMSE demodulation unit. In some embodiments, the order-adaptation unit comprises a permutation unit, QRD units, SINR metric calculators and a comparator. In some embodiments, the SSS-ML demodulation unit comprises a searcher, a minimum ED memory and an LLR calculator and wherein the searcher repeatedly uses a ED calculator to generate minimum EDs and update the currently minimum EDs. In some embodiments, the ED calculator computes PED1 and PED2 and wherein PED2 only depends on the symbol of the stronger stream. In some embodiments, PED1 calculator uses a QAM slicer to obtain the best symbol estimate of the weaker stream for a given hypothesis of the stronger stream symbol.

Figure 13:
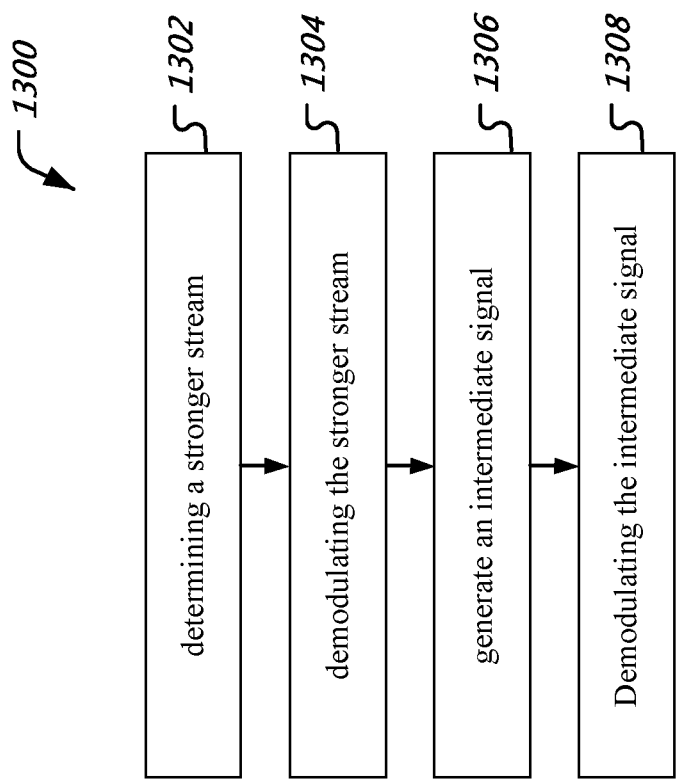
FIG. 13 shows a flowchart for an example method of receiving wireless communication signals.

FIG. 13 shows a flowchart for an example method 1300 of wireless signal reception. The method 1300 may be implemented, e.g., by a UE equipped with 2 or more receive antennas.

The method 1300 includes, at 1302, determining, from the at least two component streams, a stronger stream based on a signal quality criterion. Various techniques for determining the stronger stream are described in the present document. For example, in some embodiments, the determination is made by comparing a first post-detection signal to interference noise ratio (SINR) metric and a second post-detection SINR metric and selecting the stronger stream based on a result of the comparison, e.g., the stream having a larger value of the compared matrices. As disclosed herein, the first SNR could be computed by forming a first composite channel matrix comprising spatial signatures of the at least two component streams, performing a first QR decomposition (QRD) of the composite channel matrix, thereby by generating a Q matrix and an R matrix, and mapping elements of the R matrix into the first SINR metric. In some embodiments, the second SINR metric could be computed by reordering spatial signatures of the first composite channel matrix to generate a permutated composite channel matrix for a corresponding spatial ordering, performing a second QRD of the permutated channel matrix to generate a second Q matrix and an R matrix, and mapping elements of the second R matrix into the second SINR metric. Additional details of some embodiments are provided with respect to FIG. 5 and Eq. (2) to Eq. (4).

In some embodiments, the first composite channel matrix may be formed by placing spatial signatures of different streams to be demodulated side by side in the first composite channel matrix. In some embodiments, the first SINR metric comprises a mean of diagonal entries of the first R matrix. In some embodiments, the second SINR metric comprises a mean of diagonal entries of the second R matrix.

In some embodiments, the Q matrix corresponding to the spatial ordering with the largest SINR metric may be used to pre-process received the signal and using the pre-processed signal as input for the single-stream sliced maximum likelihood demodulation of the stronger stream. In some embodiments, the R matrix corresponding to a spatial ordering with the largest SINR metric is used for demodulating the stronger stream.

The method 1300 includes, at 1304, demodulating the stronger stream using a single-stream sliced maximum likelihood technique, e.g., as described with reference to FIG. 6B, by jointly taking into account an effect of the at least two component streams on the received signal to generate information modulated on the stronger stream.

In some embodiments, e.g., as described herein, the single-stream sliced maximum likelihood technique may include computing a Euclidean Distance (ED) as sum of two partial EDs (PEDs) PED1 and PED2, and wherein PED2 only depends on the symbol of the stronger stream whereas PED1 depends on the symbols of both the stronger and the weaker stream. In some embodiments, the computation of PED1 may be performed by computing a c-value as a function of a hypothesized value of a symbol of the stronger stream, and determining Euclidean distance using a best symbol, wherein the best symbol is determined by slicing the c-value in the QAM constellation used by the weaker stream.

The method 1300 includes, at 1306, subtracting, from the received wireless signal, a result of the demodulation of the stronger stream from the received wireless signal, thereby generating an intermediate signal.

The method 1300 includes, at 1308, demodulating, using a minimum mean square error technique, the intermediate signal to recover information modulated on a second one of the at least two component streams.

In some embodiments, the method 1300 further includes forming a composite channel matrix for recovering information, wherein the composite channel matrix includes at least two component streams comprising one or more stream for a desired user equipment and zero or more streams for another user equipment operating in a same cell as the desired user equipment and zero or more streams for yet another user equipment in a different cell than that of the desired user equipment.

In some embodiments, interference cancellation may be performed after decoding the interference signal. In some embodiments, the method 1300 may include generating a posteriori log-likelihood ratio (LLRs) for data of the stronger stream, and calculating soft symbols for soft cancellation of the stronger stream.

Figure 14:
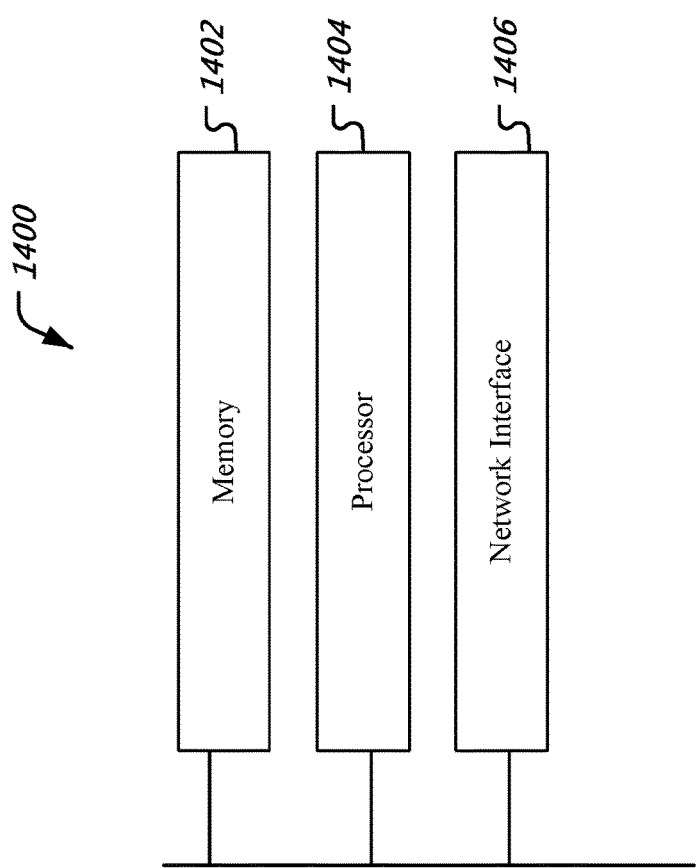
FIG. 14 shows an example of a wireless receiver apparatus.

In some embodiments, e.g., as depicted in FIG. 14, a wireless signal receiver apparatus 1400 includes a memory 1402 that stores processor-executable code comprising instructions and a processor 1404 that reads the code and executes the instructions to implement a method of recovering information from a wireless signal received from a network interface 1406 comprising at least two component streams by successively cancelling interference. The instructions include instructions for determining, from the at least two component streams, a stronger stream based on a signal quality criterion. The instructions include instructions for demodulating the stronger stream using a single-stream sliced maximum likelihood technique by jointly taking into account effect of the at least two component streams on the received signal to generate information modulated on the stronger stream. The instructions include instructions for subtracting, from the received wireless signal, a result of the demodulation of the stronger stream, thereby generating an intermediate signal. The instructions include instructions for demodulating. The instructions include instructions for using a minimum mean square error technique, the intermediate signal to recover information modulated on a second one of the at least two component streams. The instructions may also include instructions to implement variations and aspects of the method 1300, described above.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A successive interference cancellation method of recovering information from a received wireless signal comprising at least two component streams, comprising:
   determining, from the at least two component streams, a stronger stream based on a signal quality criterion;
   demodulating the stronger stream using a single-stream sliced maximum likelihood technique by jointly taking into account an effect of the at least two component streams on the received wireless signal;
   subtracting, from the received wireless signal, a result of the demodulation of the stronger stream from the received wireless signal, thereby generating an intermediate signal; and
   demodulating, using a minimum mean square error technique, the intermediate signal to recover information modulated on a second one of the at least two component streams.

2. The method according to claim 1, further comprising forming a composite channel matrix for recovering information, wherein the composite channel matrix includes at least two component streams comprising one or more stream for a desired user equipment and zero or more streams for another user equipment operating in a same cell as the desired user equipment and zero or more streams for yet another user equipment in a different cell than that of the desired user equipment.

3. The method according to claim 1, wherein the determining the stronger stream comprises:
   comparing a first post-detection signal to interference noise ratio (SINK) metric and a second post-detection SINR metric; and
   selecting the stronger stream based on a result of the comparison;
   wherein the first SINR metric is determined by:
   forming a first composite channel matrix comprising spatial signatures of the at least two component streams;
   performing a first QR decomposition (QRD) of the composite channel matrix, thereby by generating a Q matrix and an R matrix; and
   mapping elements of the R matrix into the first SINR metric; and
   wherein the second SINR metric is determined by:
   reordering spatial signatures of the first composite channel matrix to generate a permutated composite channel matrix for a corresponding spatial ordering;
   performing a second QRD of the permutated channel matrix to generate a second Q matrix and an R matrix; and
   mapping elements of the second R matrix into the second SINR metric.

4. The method according to claim 3, wherein forming the first composite channel matrix comprises placing spatial signatures of different streams to be demodulated side by side in the first composite channel matrix.

5. The method according to claim 3, wherein the first SINR metric comprises a mean of diagonal entries of the first R matrix, and wherein the second SINR metric comprises a mean of diagonal entries of the second R matrix.

6. The method of claim 3, further comprising:
   using the Q matrix corresponding to the spatial ordering with the largest SINR metric to pre-process received the signal and using the pre-processed signal as input for the single-stream sliced maximum likelihood demodulation of the stronger stream.

7. The method of claim 3, wherein the R matrix corresponding to a spatial ordering with the largest SINR metric is used for demodulating the stronger stream.

8. The method of claim 1, wherein the demodulating the stronger stream includes achieving a bit exact performance as for a maximum likelihood demodulation scheme for the stronger stream in which all component streams from the at least two component streams are jointly decoded.

9. The method of claim 8, wherein the single-stream sliced maximum likelihood technique comprises:
   computing a Euclidean Distance (ED) as sum of two partial EDs (PEDs) PED1 and PED2, and wherein PED2 only depends on the symbol of the stronger stream whereas PED1 depends on the symbols of both the stronger and the weaker stream.

10. The method of claim 9, wherein the computing PED1 comprises:
    computing a c-value as a function of a hypothesized value of a symbol of the stronger stream, and
    determining Euclidean distance using a best symbol, wherein the best symbol is determined by slicing the c-value in the QAM constellation used by the weaker stream.

11. The method of claim 1, further comprising applying the improved successive interference cancellation technique in a pre-detection SIC receiver where interference cancellation is performed independently on each subcarriers before channel decoding.

12. The method of claim 1, further comprising applying the improved successive interference cancellation technique in a post-detection SIC receiver where interference cancellation is performed after decoding the interference signal.

13. The method of claim 1, further including:
    generating a posteriori log-likelihood ratio (LLRs) for data of the stronger stream; and
    calculating soft symbols for soft cancellation of the stronger stream.

14. The method of claim 1, wherein demodulating the second one of the at least two component streams comprises scaling spatial signatures of the stronger stream to suppress residual interference of the stronger stream in a subsequent demodulation of the weaker stream.

15. A wireless signal receiver apparatus comprising:
a memory; and
a processor that reads code from the memory and executes a method of recovering information from a received wireless signal comprising at least two component streams by successively cancelling interference, the code comprising:
instructions for determining, from the at least two component streams, a stronger stream based on a signal quality criterion;
instructions for demodulating the stronger stream using a single-stream sliced maximum likelihood technique by jointly taking into account effect of the at least two component streams on the received wireless signal;
instructions for subtracting, from the received wireless signal, a result of the demodulation of the stronger stream, thereby generating an intermediate signal; and
instructions for demodulating, using a minimum mean square error technique, the intermediate signal to recover information modulated on a second one of the at least two component streams.

16. The apparatus according to claim 15, wherein the composite channel matrix includes at least two component streams comprising one or more stream for a desired user equipment and zero or more streams for another user equipment operating in a same cell as the desired user equipment and zero or more streams for yet another user equipment in a different cell than that of the desired user equipment.

17. The apparatus according to claim 15, wherein the instructions for determining the stronger stream comprises:
instructions for comparing a first post-detection signal to interference noise ratio (SINR) metric and a second post-detection SINR metric; and
instructions for selecting a stream with larger SINR metric to be the stronger stream;
wherein the first SINR metric is determined by:
forming a first composite channel matrix comprising spatial signatures of the at least two component streams;
performing a first QR decomposition (QRD) of the composite channel matrix, thereby by generating a Q matrix and an R matrix;
mapping elements of the R matrix into the first SINR metric; and
wherein the second SINR metric is determined by:
reordering spatial signatures of the first composite channel matrix to generate a permutated composite channel matrix;
performing a second QRD of the permutated channel matrix to generate a second Q matrix and an R matrix;
mapping elements of the second R matrix into the second SINR metric.

18. The apparatus according to claim 17, wherein the instructions for forming the first composite channel matrix comprise instructions for placing spatial signatures of different streams to be demodulated side by side in the first composite channel matrix.

19. The apparatus according to claim 17, wherein the first SINR metric comprises a mean of diagonal entries of the first R matrix, and wherein the second SINR metric comprises a mean of diagonal entries of the second R matrix.

20. The apparatus of claim 17, wherein the code further includes:
instructions for using the Q matrix to pre-process received the signal and using the pre-processed signal as input for the single-stream sliced maximum likelihood demodulation.

* * * * *